June 23, 1936.   M. RESEK   2,045,054
INTERMITTENT ABSORPTION REFRIGERATING SYSTEM
Original Filed Oct. 20, 1933    2 Sheets-Sheet 2
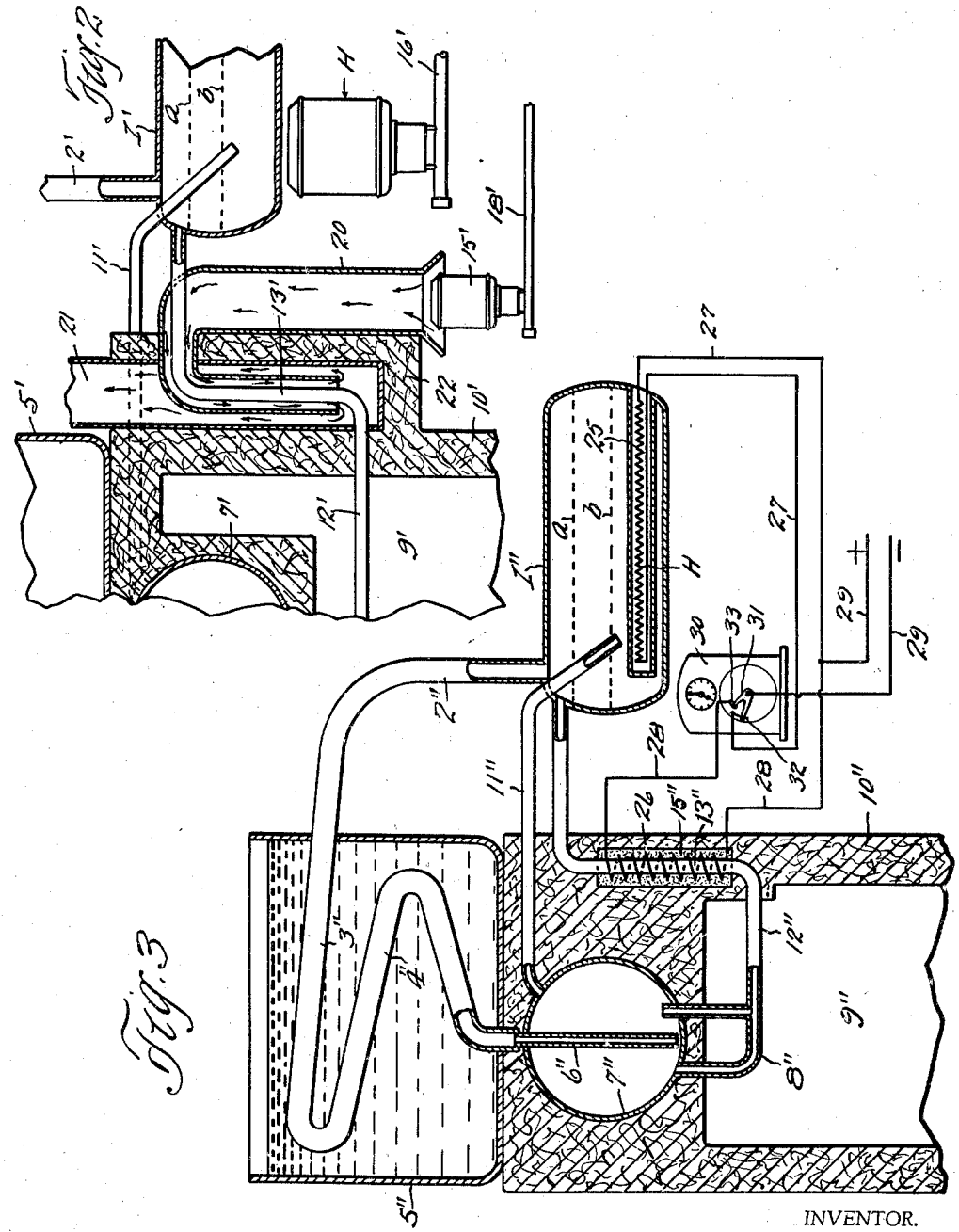
INVENTOR.
Marc Resek
BY
Hull, Brock & West
ATTORNEYS Patented June 23, 1936

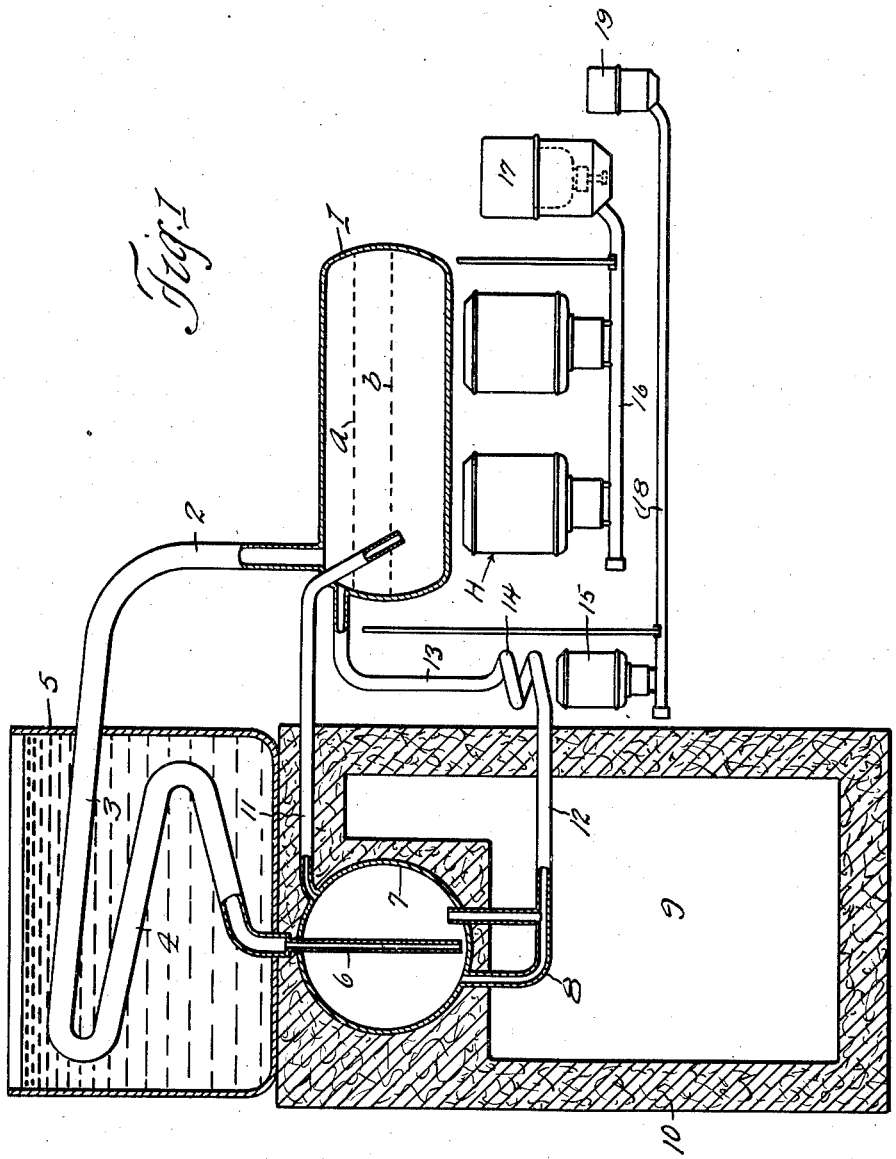

2,045,054

UNITED STATES PATENT OFFICE 2,045,054

INTERMITTENT ABSORPTION REFRIGERATING SYSTEM

Marc Resek, Cleveland Heights, Ohio, assignor to Perfection Stove Company, Cleveland, Ohio, a corporation of Ohio Application October 20, 1933, Serial No. 694,456
Renewed August 7, 1935

15 Claims. (Cl. 62—120.5)

This invention relates to refrigeration apparatus or systems of the intermittent absorption class including, among other essentials, a generator, an evaporator, and means for periodically heating the generator. As is well known, a system of the aforesaid class is hermetically sealed and contains a quantity of refrigerant, such as ammonia, and an absorbent therefor, such as water, in proper proportions, this mixture being known as the refrigerant liquor; and at the beginning of a cycle of operation, all, or practically all, of the liquor is present in the generator. Upon heat being imparted to the generator, the liquor boils and is distilled over into the evaporator; and, although provisions may be made for dehydrating the refrigerant vapors before they are condensed and delivered to the evaporator, a certain amount of the absorbent condensate finds its way with the liquefied refrigerant to the evaporator. Unless means is provided for returning this so-called residue liquid from the evaporator to the generator end of the system at reasonably frequent intervals, the residue liquid may accumulate within the evaporator to such an extent as to greatly impair or destroy the effectiveness of the refrigerating system.

It is the primary purpose of my present invention to overcome the above difficulty by providing thoroughly dependable means for positively returning to the generator end of the system during the early stage of a heating period any residue liquid that has been left in the evaporator end of the system at the conclusion of the previous cooling period—this being the period when the anhydrous refrigerant is evaporating and returning in the form of gas to the generator end of the system to be re-absorbed by the relatively weak liquor therein and serving, by such evaporation, to extract heat from the refrigeration space of the apparatus.

A further object of the invention is to provide a system including a residue liquid return that is of such a nature as will permit of the location of the generator in, or above, the plane of the evaporator, if desired.

Other objects will appear as I proceed to describe my invention in detail by reference to the accompanying drawings wherein Fig. 1 is a diagrammatic representation of a refrigerating system incorporating a form of the invention in which the liquid return is heated by a combustion device; Fig. 2 is a fragmentary view of a modification of the construction shown in Fig. 1, and Fig. 3 discloses a form in which the liquid return is electrically heated. The same reference characters are used in the three views of the drawings to designate the parts that are common to the embodiments illustrated, respectively, by said views; and to avoid confusion primes are added to the reference characters of Fig. 2 and double primes to those of Fig. 3.

The construction and mode of operation of the invention may be ascertained from the following: Considering the condition of the apparatus just prior to the beginning of a cycle of operation, and with reference to Fig. 1, the refrigerant liquor stands within the generator-absorber 1 to about the level indicated by the dotted line a. When heat is applied to the generator 1 by placing the heating means H in operation, the liquor will boil and the vapors will pass through a conduit 2 and a dehydrator 3 to a condenser 4 wherein they will be liquefied under the high pressure then prevailing in the system and under the influence of the body of cooling fluid, such as water, that is contained within the tank or receptacle 5 wherein the dehydrator 3 and condenser 4 are submerged; and this refrigerant condensate will gravitate through the delivery conduit 6 into a receiver 7 in which said delivery conduit is liquid sealed. From the receiver 7 the anhydrous refrigerant flows into an evaporator 8 that is located within the refrigerating space 9 enclosed by an insulated cabinet 10. As shown, the receiver 7 is jacketed within an insulated part of the cabinet so as to reduce to a minimum any transfer of heat therefrom to the refrigerating space 9 during the heating-condensing period of a cycle of operation.

The heating period continues until a full charge of refrigerant has been distilled over into the receiver-evaporator, and upon the cessation of heat and the consequential lowering of the pressure within the system, the refrigerant starts to evaporate and the resultant gas returns through a conduit 11 to the generator-absorber 1 and is re-absorbed by the relatively weak liquor therein, the conduit 11 opening into said generator-absorber below the minimum liquid level therein, indicated by the dotted line b.

Although it is intended that absorbent vapors escaping with the refrigerant vapors from the generator-absorber 1 be condensed within the dehydrator 3 and flow back to the generator-absorber, a low percentage of the absorbent vapors frequently pass on with the refrigerant vapors and are liquefied in the condenser 4 and find their way to the receiver-evaporator end of the system, accumulating therein during the charging of the receiver-evaporator; and at the conclusion of the subsequent cooling period, a residue consisting of the absorbent condensate and a certain amount of the refrigerant condensate remains in the evaporator end of the system and this is returned to the generator-absorber end of the system through a conduit 12 that leads from a low part of the evaporator to the generator-absorber above the maximum liquid level therein. A portion 13 of this conduit is upwardly extended or vertically disposed (and may include a coil 14 according to Fig. 1). Operatively associated with said portion is a heating device 15 whose action is confined to the early part of the heating period of the apparatus, during all of which period the heating means 2 is effective. By heat being thus applied to the portion 13 of the conduit 12, bubbles are created within the liquid in said portion, causing said liquid to rise with the bubbles and spill over into the generator-absorber, which action continues until the evaporator end of the system is practically cleared of residue liquid; and, it may be explained, this occurs before any appreciable amount of condensate is delivered to the receiver-evaporator. Thus it will be seen that my improved liquid return operates on the principle of and is, in effect, a gas lift, the conduit 12, with its portion 13, constituting the pumper tube.

The foregoing description applies not only to the form of the invention illustrated in Fig. 1 but as well to the modifications of Figs. 2 and 3, and it may be read on the latter modifications by keeping in mind that the same reference characters apply to the corresponding parts of the three embodiments, augmented in Fig. 2 by primes, and in Fig. 3 by double primes.

In the forms of the invention illustrated in Figs. 1 and 2, the heating means H, H' consist of oil burners to which fuel is supplied through pipes 16, 16' from suitable reservoirs (one of such being shown in Fig. 1 at 17) that hold only enough fuel to maintain the burners in operation throughout a heating period. The heating devices 15, 15' of the embodiments at present under consideration may also consist of oil burners to which fuel is supplied through pipes 18, 18' that lead from reservoirs (one being shown in Fig. 1 at 19) having a capacity to maintain the burners 15, 15' in operation for only a fraction of the time that the former burners H, H' are in operation. It is the intention that all the burners be lighted at the same time so that the portions 13, 13' of the liquid return conduits 12, 12' will receive heat at the very beginning of a heating period of the apparatus but, because of the limited fuel supply of said burners, they will cease to operate and the liquid return means will become ineffective a very considerable length of time before the heating period of the apparatus is concluded. If the operation of the heating devices 15, 15' were not so curtailed, the evaporator would be robbed of some of the freshly distilled refrigerant. It is important, therefore, to confine the action of the liquid return to the very early stage of the heating period of the system.

To insure against the operation of the liquid return means being unduly prolonged or occasionally resumed under the influence of the relatively warm atmosphere, the pumper tube may be insulated therefrom, as in Fig. 2. According to this embodiment, the products of combustion from the device 15' are carried upwardly and thence downwardly by a chimney 20 and discharged into the lower end of a flue 21 that is surrounded by an insulating jacket 22. The pumper tubes 12'—13' leads upwardly through the flue and inside the descending end of the chimney where it receives the greatest heat during the time the heating device 15' is in operation. However, by reason of the construction of the chimney and flue, a trap is formed in which cold air will be confined during the cooling period so that there will be no circulation and consequently no heat reaching the pumper tube after the parts have once cooled down to cause further so-called "pumping" or gas lift action.

Obviously, in either of the forms illustrated in Figs. 1 or 2, gas burners or other heating means might be substituted for the combustion devices shown; and this applies to both the main burner for heating the generator, and the auxiliary burner for motivating the liquid return.

In Fig. 3 I have shown an electrical heater, comprising a resistor element or coil 25, as constituting the main heating device H" for the generator 1", and a similar heater, including an insulated coil 26, as the device 15" for imparting heat to the portion 13" of the liquid return conduit 12". In this case the upwardly extending portion of such conduit—or the pumper tube, so to speak—is thoroughly insulated from the surrounding atmosphere by being embedded with the heating device, in the wall of the cabinet 10". The resistor elements of the two heating devices H" and 15" are in the respective branches 27 and 28 of an electric circuit, the main portion of which is represented by the leads or conductors 29, and the flow of current through said resistor elements is controlled by a time switch 30. As the two-fingered contact member 31 of said switch rotates, at a rate, for example, of once every twenty-four hours, its two fingers will simultaneously engage the segments 32 and 33, that control the respective branches 27 and 28 of the circuit, and, because of the difference in length of said segments and the ratio of such length to the complete orbital travel of the contact member, will maintain the heating device H" of the generator effective about two hours and the heating device 15" of the liquid return effective about one-half hour.

Having thus described my invention, what I claim is:

1. In an intermittent absorption refrigerating system including generator, evaporator, and means for periodically heating the generator; a conduit through which residue liquid is returned from the evaporator section of the system to the generator section thereof, the same having an upwardly extending portion, and means for administering heat to said portion and whose action is confined to the early stage of the heating period of the system.

2. In an intermittent absorption refrigerating system including generator, evaporator, and means for periodically heating the generator; a conduit leading from a residue liquid collecting part of the evaporator section of the system to a part of the generator section above the maximum liquid level therein, said conduit having an upwardly extending portion, a combustion device, a chimney within which said portion of the conduit is situated and into which the combustion device discharges its products, and means promoting a draft through the chimney only when the combustion device is in operation.

3. In an intermittent absorption refrigerating system including generator, evaporator, and means for periodically heating the generator; a conduit through which residue liquid is returned from the evaporator section of a system to the generator section thereof, the same having an upwardly extending portion, and a combustion device for heating said portion and whose operation prevails for only a fraction of the heating period of the system.

4. In an intermittent absorption refrigerating system including generator, evaporator, and means for periodically heating the generator; a conduit leading from a residue liquid collecting part of the evaporator section of the system to a part of the generator section above the maximum liquid level therein, said conduit having an upwardly extending portion, a combustion device for heating said portion, and a fuel supply means therefor having a capacity to maintain said device in operation for only a fraction of the heating period of the system.

5. In an intermittent absorption refrigerating system including generator, evaporator, and means for periodically heating the generator; a conduit leading from a residue liquid collecting part of the evaporator section of the system to a part of the generator section above the maximum liquid level therein, said conduit having an upwardly extending portion, and means for administering heat to said portion and whose action is restricted to the early stage of the heating period of the system.

6. In an intermittent absorption refrigerating system including generator, evaporator, and means for periodically heating the generator; a conduit through which residue liquid is returned from the evaporator section of the system to the generator section thereof, the same having an upwardly extending portion, an oil burner for heating said portion, and an oil supply means therefor having a capacity to maintain the burner in operation for only a fraction of the heating period of the system.

7. In an intermittent absorption refrigerating system including generator, evaporator, an oil burner for heating the generator, and an oil supply means therefor having a capacity sufficient only to maintain said burner in operation during the complete heating period; a conduit through which residue liquid is returned from the evaporator section of the system to the generator section thereof, the same having an upwardly extending portion, an oil burner for heating said portion, and an oil supply means therefor having a capacity to maintain the second mentioned burner in operation for only a fraction of the time the former burner is in operation.

8. In an intermittent absorption refrigerating system including generator, evaporator, and means for periodically heating the generator; a conduit leading from a residue liquid collecting part of the evaporator section of the system to a part of the generator section above the maximum liquid level therein, said conduit having an upwardly extending portion including a liquid diffusing element, and a combustion device for heating said element and whose operation is confined to the early stage of the heating period of the system.

9. In an intermittent absorption refrigerating system including generator, evaporator, and means for periodically heating the generator; a conduit through which residue liquid is returned from the evaporator section of the system to the generator section thereof, the same having an upwardly extending portion, a flue through which said portion extends, and a combustion device arranged to discharge its products into said flue.

10. In an intermittent absorption refrigerating system including generator, evaporator, and means for periodically heating the generator; a conduit through which residue liquid is returned from the evaporator section of the system to the generator section thereof, the same having an upwardly extending portion, a heat insulated flue in which said portion is encased, an oil burner, and a chimney for conveying the products of combustion therefrom downwardly into the flue about said conduit portion.

11. In an intermittent absorption refrigerating system including generator, evaporator, and means for periodically heating the generator; a conduit through which residue liquid is returned from the evaporator section of the system to the generator section thereof, the same having an upwardly extending portion, and electrical means for heating said portion and whose operation prevails for only a fraction of the heating period of the system.

12. In an intermittent absorption refrigerating system including generator, evaporator, and means for periodically heating the generator; a conduit for returning residue liquid from the evaporator section of the system to the generator section thereof, said conduit having an upwardly extending portion, and electrical means for heating said portion and whose operation is confined to the early stage of the heating period of the system, the said portion and the electrical heating means therefor being heat insulated.

13. In an intermittent absorption refrigerating system including generator, evaporator, and electrical means for periodically heating the generator; a conduit leading from a residue liquid collecting part of the evaporator section of the system to the generator section, said conduit having an upwardly extending portion, electrical means for heating said portion, circuits for supplying current to both said means, and a control therefor maintaining the second means effective during the early stage only of the period through which it renders the first means operative.

14. In an intermittent absorption refrigerating system including generator, evaporator, and means for periodically heating the generator; a conduit leading from a residue liquid collecting part of the evaporator section of the system to the generator section, said conduit having an upwardly extending portion, means for heating said portion, and an arrangement whereby both heating means are set in operation substantially simultaneously and the first mentioned one is maintained in operation for a considerably longer period of time than the second.

15. In an intermittent absorption refrigerator including a generator-absorber section, an evaporator, means for administering heat to the generator-absorber section, fluid conveying means for conducting vapors from the generator-absorber section and delivering them in condensed form to the evaporator and for returning gas from the evaporator to the generator-absorber section; a gas lift for removing from the evaporator practically all liquid remaining therein at the conclusion of a cooling period and delivering it to the generator-absorber section at the beginning of the next heating period.

MARC RESEK.